(No Model.)

F. H. RICHARDS.
WEIGHING MACHINE.

No. 600,027. Patented Mar. 1, 1898.

Witnesses:
D. S. Hawkins.
Fred. J. Dole.

Inventor:
F. H. Richards (No Model.)  F. H. RICHARDS.  4 Sheets—Sheet 4.
WEIGHING MACHINE.
No. 600,027.  Patented Mar. 1, 1898.

Witnesses:
D. S. Hawkins.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,027, dated March 1, 1898.

Application filed July 12, 1897. Serial No. 644,171. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing Apparatus, of which the following is a specification.

This invention relates to weighing apparatus, and it embodies, preferably, a plurality of weighing mechanisms each of which is operative independent of the other; and one of the objects of the invention is to combine with said mechanisms a conveyer movable in different directions for supplying material to the load-receivers of the respective weighing mechanisms.

In the form of the invention represented the conveyer is supported for movement in opposite directions, it being adapted when driven in one way to supply one of the weighing mechanisms or the load-receiver thereof with a load and when driven in the reverse direction to furnish the requisite load to the other weighing mechanism, so that the valve, which is usually furnished with a power-driven feeder for catching the drizzle therefrom on its stoppage, can be dispensed with.

Another object of the invention is to provide, in connection with a regulator intermittingly shifted by loads of material discharged from the weighing mechanism, a locker for one of the members of the weighing mechanism, said locker being coöperative with the beam in the present case and thrown into action by the shifting of the regulator, which is operated by a discharging load.

Figure 1:
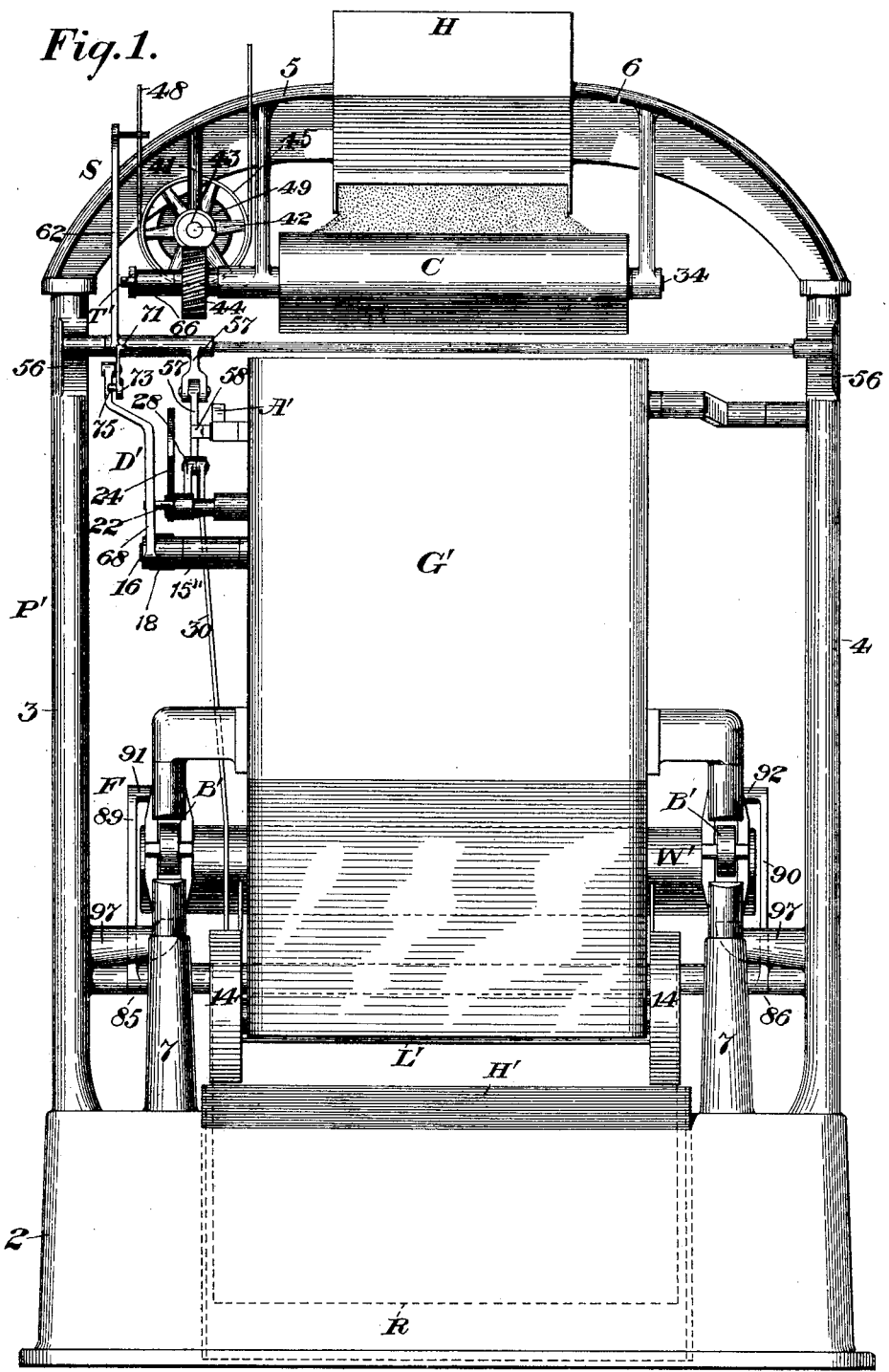
Figure 2:
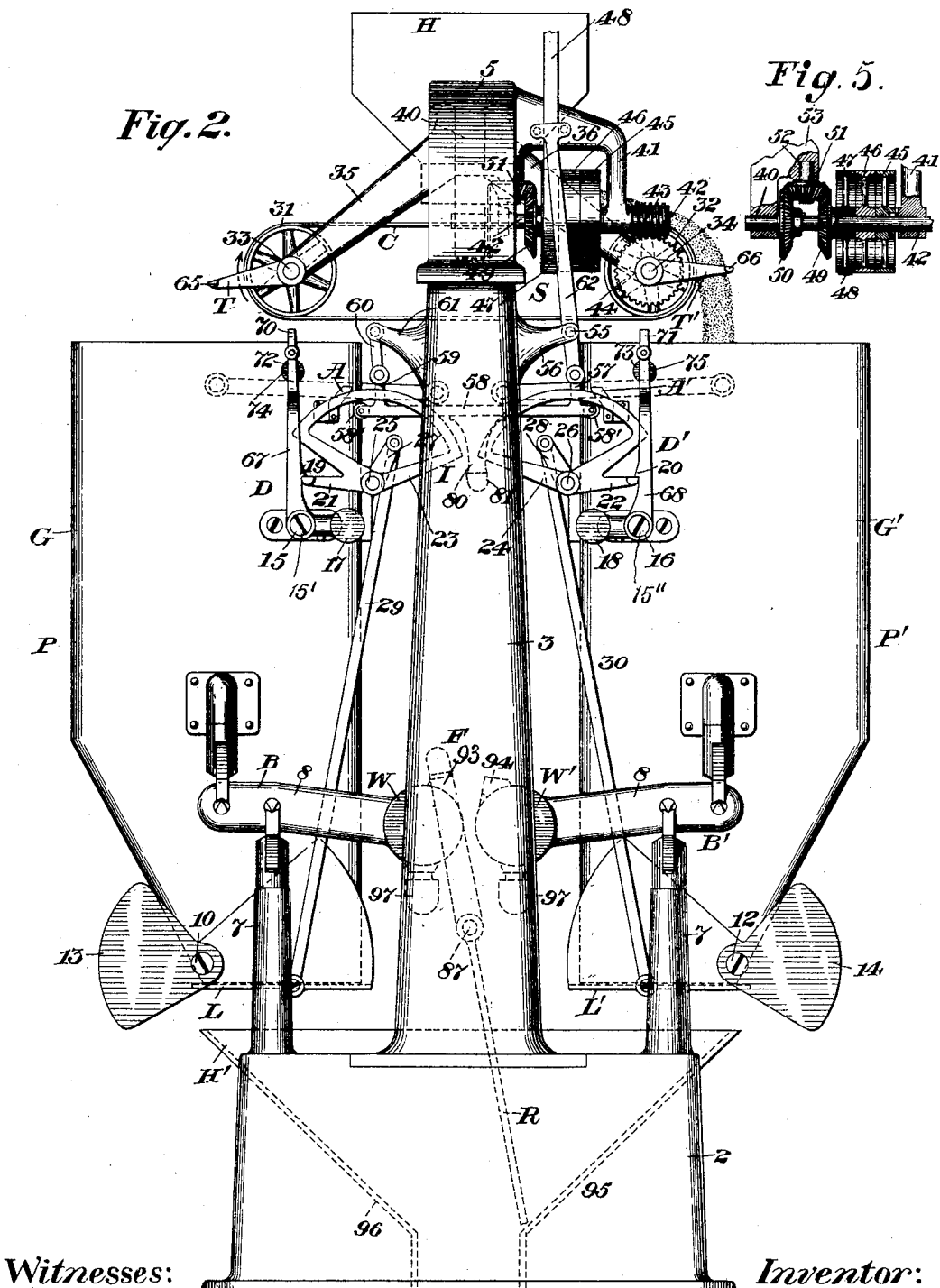
Figure 3:
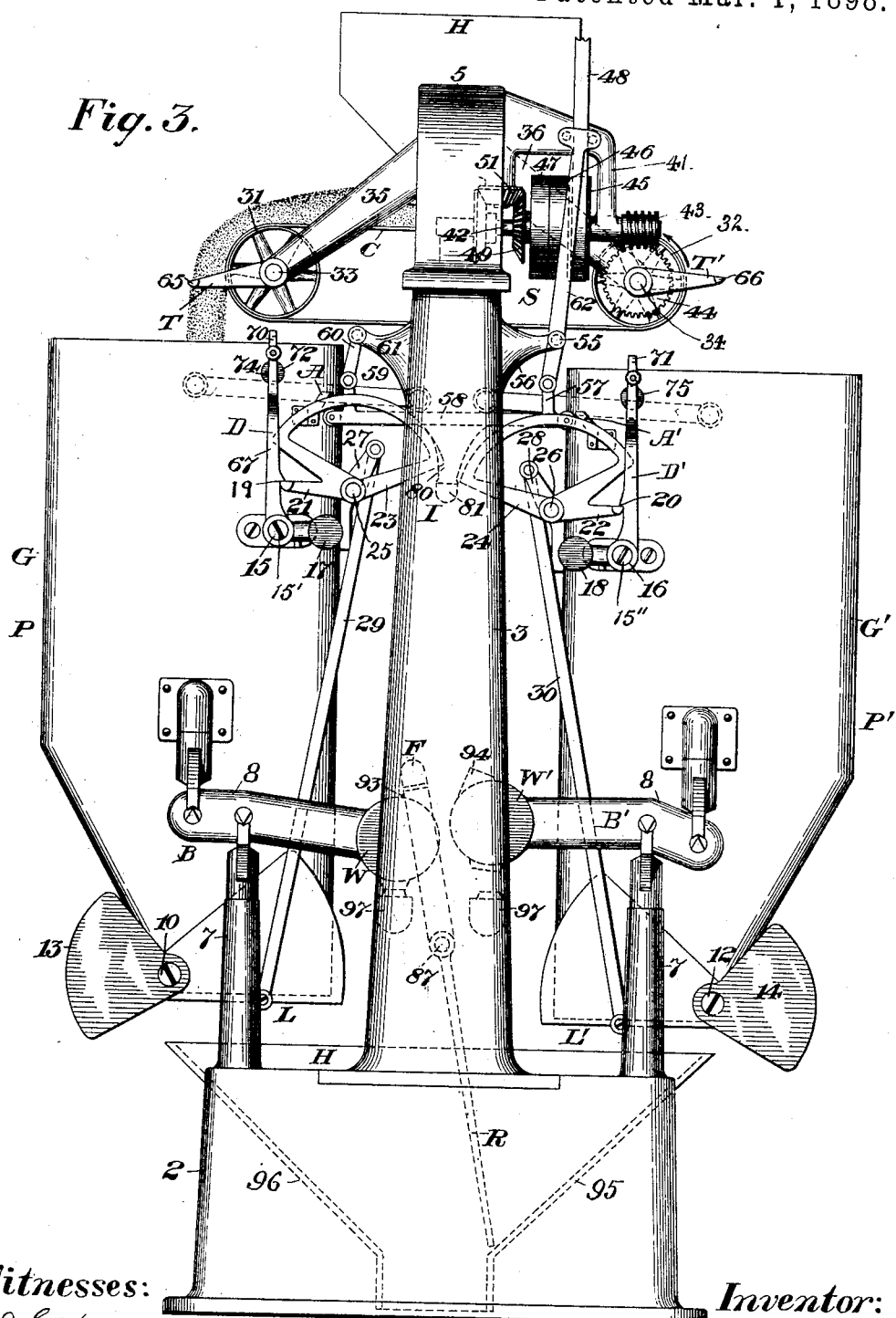
Figure 4:
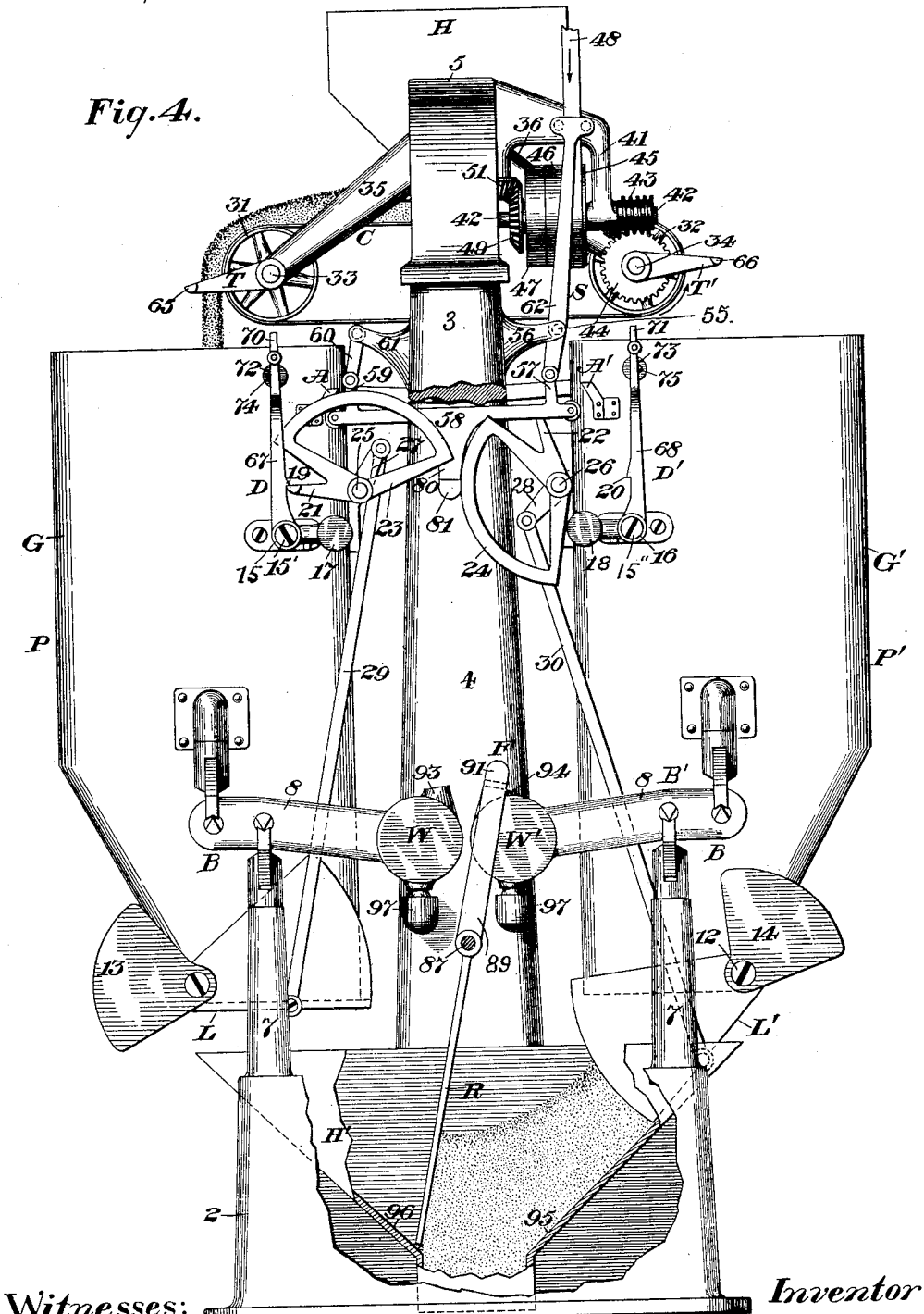

In the drawings accompanying and forming part of this specification, Figure 1 is a front elevation of my improved weighing apparatus. Figs. 2 and 3 are side elevations of the same as seen from the left in Fig. 1, showing the conveyer supplying a stream to each of the load-receivers. Fig. 4 is a similar view showing the right-hand load-receiver discharging its load, and Fig. 5 is a sectional detail view of a portion of the supply-conveyer-driving mechanism.

Similar characters designate like parts in all the figures of the drawings.

The framing of the machine in the present instance consists of a chambered base or bed 2, the side frames 3 and 4, mounted thereon, and the brackets 5 and 6, extending laterally from the supply-hopper H and secured to the side frames.

The present invention comprehends a plurality of weighing mechanisms, which may be of any suitable type, each of those represented consisting of a load-receiver and a scale-beam.

For convenience the weighing mechanisms are designated, respectively, by P and P'. The load-receiver of the weighing mechanism P is designated by G and its supporting scale-beam by B, and the load-receiver of the weighing mechanism P' is designated by G' and its scale-beam by B'.

The scale-beams B and B' are fulcrumed upon the posts 7, rising at proper intervals from the upper face of the base 2, and each consists of a pair of arms 8, joined by a counterweight. The counterweights are designated, respectively, by W and W'.

The load-receivers G and G' are mounted at the poising ends of the two beams. Each of the load-receivers has the usual discharge-outlet, through which the loads can intermittently and alternately pass, such openings being covered by the closers, as L and L', of ordinary construction, pivoted, respectively, as at 10 and 12, to the respective load-receivers and having the counterweighted end plates 13 and 14, adapted to shut the respective closers on the discharge of a load.

The means for governing the discharge of the load include latches for each weighing mechanism, such as D and D', pivoted, as at 15 and 16, respectively, upon the projections 15' and 15" on the two load-receivers, said latches having weights 17 and 18 to throw the catches 19 and 20 thereof into engagement with the arms 21 and 22, respectively, of the segmental rockers 23 and 24, pivoted, as at 25 and 26, to the load-receivers G and G'.

The segmental rockers 23 and 24 are furnished with the arms 27 and 28, respectively, to which the rods 29 and 30 are pivoted, said rods being likewise attached at their lower ends to the closers L and L', respectively.

In connection with the several load-receivers I provide a supply-conveyer mounted below the hopper or chute H and adapted to move in opposite or reverse directions, as indicated by the arrows, respectively, in Figs. 2 and 3. The conveyer may be of any suitable type, and it is represented consisting of an endless band or belt C, supported upon the rolls or drums 31 and 32, whose shafts 33 and 34 are journaled in the arms 35 and 36, extending in opposite directions from the brackets 5 and 6.

In Fig. 2 the supply-conveyer C is illustrated conducting a stream of material from the hopper H into the load-receiver G' to build up the load therein, and on the completion of the load, instead of stopping the conveyer and furnishing a valve or equivalent device to catch the drizzle therefrom, the movement of the conveyer is reversed, whereby the material will be prevented from falling over the discharge edge of the conveyer and to the completed load.

In Fig. 3 the conveyer C is represented supplying a stream to the load-receiver G, and when the load is completed therein the direction of movement of the conveyer is reversed, and these operations will alternate so long as the apparatus is in action.

The mechanism for driving the supply-conveyer and effecting a change in the direction of movement is preferably controlled by the weighing mechanism, so that when a load in one receiver is completed the supply can be diverted therefrom and toward the other load-receiver. The mechanism herein illustrated for driving and for effecting the changes in the direction of movement of the conveyer C will now be described.

The bracket 5 is furnished with the hangers 40 and 41, Fig. 5, which are adapted to support a shaft 42, having at one end the worm or screw 43, meshing with the worm-gear 44 on the shaft 34 of the conveyer C. The shaft 42 has a series of pulleys 45, 46, and 47, along which the belt 48 (see Fig. 5) is shiftable, said belt being connected with a power-transmitting device of suitable sort. (Not shown.) The shaft 42 also carries the bevel-gears 49 and 50, adapted to mesh with the intermediate bevel-gear 51, whose vertical spindle or shaft 52 works in a bearing 53 on the hanger 40. The pulley 45 is secured to the shaft 42, while the next adjacent pulleys 46 and 47 are loose thereon. The bevel-gear 49 is secured to the pulley 47, and the bevel-gear 50 is secured to the shaft. It will be apparent that when the belt 48 is on the pulley 45 the conveyer C will be driven in the direction of the arrow in Fig. 3 to conduct a stream into the load-receiver G. It will likewise be evident that when the belt 48 is shifted to the pulley 47 the conveyer C will be driven in the opposite direction, or, as indicated by the arrow in Fig. 2, through the series of gears described. The shipper for the belt 48 may be of any suitable character, and it is represented consisting of a lever S, pivoted, as at 55, to the projection or lug 56 on the side frame 3, said lever being pivoted at its lower end to the ear 57 of the transverse reciprocatory bar 58, said bar having a similar lug 59 near its opposite end, to which the link 60 is pivoted, the opposite end of the link being pivoted to the projection 61, corresponding to the opposite projection 56 on the side frame 3. When the bar 58 is thrust in one direction, or what is herein illustrated as the "left," or from the position shown in Fig. 2 to that illustrated in Fig. 3, the working arm 62 of the belt-shipper will be oppositely swung to carry the belt 48 from the pulley 47 to the pulley 45, the belt first passing along the idle-pulley 46. When the bar 58 is thrust to the right from the position shown in Fig. 3 to that illustrated in Fig. 2, the opposite action will take place, and for thus operating the bar actuators, mounted, preferably, on the load-receivers G and G', respectively, are provided, such actuators being designated, respectively, by A and A', and they are shown consisting of projections or fixtures secured near the upper inner corners of the two load-receivers and are adapted alternately to strike the bar on the descent of the respective load-receivers. In Fig. 2 the load-receiver G' has nearly received its completed load, the actuator A' being contiguous to the roll 58' on the right-hand end of the bar. On the completion of the load and the further descent of the load-receiver the actuator will thrust the bar 58 to the left for operating the shipper S in the manner hereinbefore set forth to shift the belt 48 from the pulley 47 to the pulley 45. When the load in the receiver G is almost completed, the actuator A will strike the roll 58'' and on the completion of the load will force the bar 58 to the right to ship the belt 48 from the pulley 45 to the pulley 47.

For the purpose of effecting the alternate discharge of the weighing mechanism I prefer to employ means operative with the supply-conveyer C, such as the trippers T and T', coöperative with the latches D and D' hereinbefore described, the trippers consisting of arms secured to the shafts 33 and 34, respectively, of the supply-conveyer, the trippers or arms having the projections 65 and 66, adapted alternately to strike the upper ends of the latches D and D', respectively. The vertical or upright arms 67 and 68 terminate in the switches 70 and 71, pivoted to the upper extremities of the two arms and weighted, as at 72 and 73, respectively, the weights being furnished with stops 74 and 75, bearing against said arms.

The operation of the latches and the tripping means will be clearly obvious from an inspection of the side elevations of the drawings. In Fig. 2 the conveyer is running in the direction of the arrow to supply the load-receiver G' with a stream of material, and as the shaft 34 rotates the projection 66 on the tripper T will strike and pass by the switch 71. On the reversal of the conveyer C in the manner hereinbefore specified the shaft 34, and consequently the tripper 66, will be reversed, so that when the projection 66 strikes the by-pass 71 the stop or pin 75 will be forced against the arm 68, whereby said arm will be swung to what is herein illustrated as the "right" and the offset or shoulder 20 will be disengaged from the rocker-arm 22 to release the closer L', it being evident that at this time the load in the receiver G' is completed. The load is then emptied into the discharge-hopper H', secured within the chambered base 2. The same action with respect to the latch D takes place when the load in the receiver G is completed and the conveyer C is reversed.

In connection with the belt-shipping and load-discharging mechanisms I provide reciprocally-effective stops. The segmental rockers 23 and 24, which I have hereinbefore described as connected with the closer, serve as two of said stops. A third coöperating stop is designated by I, and it consists of the offset 80 on the reciprocatory belt-shipper-operating bar 58 and the projection 81 at the lower end of said offset.

The operation of the stop mechanism is as follows: In Fig. 4 the closer L' is illustrated open, and the curved face of the segmental stop 24 is shown in contact with the stop or projection 81, whereby the stop will positively prevent the movement of the bar 58 to the right so long as the closer L' is open. When the closer is shut, however, the rod 30 will be thrust upward and the stop 24 swung about its axis and out of contact with the projection 81, thereby releasing the bar 58, so that it can be operated in the manner hereinbefore set forth. When the closer L opens, the same operation will take place, the stop 23 coöperating with the stop 81 to block the action of the bar.

It will be apparent from an inspection of Figs. 2 and 4 that the stop 81 is alternately disposed in the paths of movement of the two stops 23 and 24 to block the action of the same, whereby both closers cannot be opened at the same time. The loads intermittingly discharged alternately by the load-receivers G and G' are emptied into the discharge-hopper H', in which the regulator R is movable, the regulator being shifted by the loads to throw a locker for one of the members of the weighing mechanism into operation. Said locker is preferably coöperative with the beams B and B', it being adapted to lock one beam against action while the load in the other mechanism is being discharged. The regulator R is pivotally supported for oscillatory or pendulous movement, and it consists of a flat plate having at its upper corner the hubs 85 and 86, adapted to receive the pivot-screws 87, working in the side frames 3 and 4, respectively. The locker for the scale-beams B and B' is designated by F, and it consists of the vertical arms 89 and 90 on the two hubs 85 and 86, provided with the lateral locking projections or lugs 91 and 92, coöperative with the bosses 93 and 94, located at opposite ends of the weights W and W', the upper faces of the bosses 93 and 94 being flat or plane.

In Fig. 2 the lower end of the regulator R is shown in contact with the inclined wall 95 of the discharge-hopper and the locker F is in engagement with the beam-weight W, the load in the receiver G' being nearly completed. On the completion of a load the latch D' will be tripped and the closer L' forced open by the weight of the material in said receiver and the load will strike and swing the regulator R to the left until it strikes the inclined hopper-wall 96, as shown in Fig. 4. Immediately on the discharge of the load the beam-weight W' will drop, and it will reach the supports 97 on the framework about the time the first part of the load strikes the regulator, so that the latter can be swung to the left to carry the locking projections 91 and 92 of the locking-arms 89 and 90 over and in contact with the bosses 94 of the beam-weight W', as illustrated in Fig. 4, to lock the beam against action. A similar operation with respect to the scale-beam B will take place on the discharge of the load-receiver G. When the load is discharged from the load-receiver G, the closer L will shut, but as long as the mass acts against the regulator R it will be held in its shifted position to lock the beam B against descending to the poising-line, although it may have a limited amount of movement, as shown by the space in Fig. 4.

The operation of the hereinbefore-described apparatus, briefly set forth, is as follows: In Fig. 2 the closers L and L' are represented shut and held in such positions by the latches D and D', engaging the rocker-arms 21 and 22. The belt 48 is on the pulley 47, as shown also in detail in Fig. 5, so that the conveyer C will be driven in the direction of the arrow, as indicated in Fig. 2, to conduct a stream of material from the hopper H into the load-receiver G'. When a certain proportion of the predetermined load has been received by the load-receiver, it, with the poising end of the beam B', will descend, and when the load is nearly completed the actuator A' will be approximately in contact with the roll 58' on the bar 58, so that on the further movement of the load-receiver the actuator will strike the bar 58 and shift it to the left to operate the shipper S, so that the latter can carry the belt 48 to the pulley 45, as shown in Fig. 3, to reverse the action of the supply-conveyer C, whereby the latter will conduct the material to the load-receiver G. When the conveyer C is supplying the load-receiver G', the tripper T' rotates with the conveyer-shaft 34 and intermittingly strikes and passes by the switch 71. On the reversal of the movement of the conveyer the projection 66 on the end of the tripper will strike the switch 71, which at this time constitutes in effect a fixed extension on the detent-arm 68, so that said arm is swung to the right and the shoulder 20 disengaged from the rocker-arm 22, thereby releasing the closer L'. On the release of the closer the mass of material is emptied into the hopper H' to shift the regulator R for performing the functions hereinbefore specified. When the closer L' shuts, the weighing mechanism P' will return to its primary position to repeat the operation. A similar operation will take place with respect to the weighing mechanism P, and these will alternate so long as the machine is in action.

Having described my invention, I claim—

1. The combination of a plurality of weighing mechanisms, each embodying a load-receiver; a conveyer mounted for movement in different directions; mechanism for driving the conveyer in one direction to supply one load-receiver and for driving it in another direction to supply the other load-receiver; and means for effecting a change in the direction of feed of the conveyer when the respective load-receivers have received a certain quantity of material.

2. The combination of a plurality of weighing mechanisms each embodying a load-receiver; a conveyer mounted for movement in opposite directions; mechanism for driving the conveyer in one direction to supply one load-receiver and for driving it in the reverse direction to supply the other load-receiver; and means for reversing the conveyer when the respective load-receivers have received a certain quantity of material.

3. The combination of a plurality of weighing mechanisms, each embodying a load-receiver; a conveyer mounted for movement in different directions; mechanism for driving the conveyer in one direction to supply one load-receiver and driving it in the opposite direction to supply the other load-receiver; and means controlled by the weighing mechanisms for effecting a change in the feed of the conveyer when the respective load-receivers have received a certain quantity of material.

4. The combination of a plurality of weighing mechanisms, each embodying a load-receiver; an endless belt mounted for movement in different directions; mechanism for driving the said endless belt in one direction, thereby to supply one load-receiver and for driving it in another direction to supply the other load-receiver; and means for effecting a change in the direction of feed of the endless belt when the respective load-receivers have received a certain quantity of material.

5. The combination of a plurality of weighing mechanisms, each embodying a load-receiver; an endless conveyer mounted for movement in opposite directions; a supply-hopper carried by the framework and located over the conveyer; and means for driving the conveyer in opposite directions, first to supply one load-receiver and then to supply the other load-receiver.

6. The combination of a plurality of weighing mechanisms, each embodying a load-receiver; a conveyer mounted for movement in different directions; mechanism for driving the conveyer in one direction to supply one load-receiver and for driving it in another direction to supply the other load-receiver; and means mounted on a load-receiver for effecting a change in the direction of movement of the conveyer.

7. The combination of a plurality of weighing mechanisms, each embodying a load-receiver; a conveyer mounted for movement in different directions; mechanism for driving and for reversing the conveyer to supply, first, one load-receiver and then the other, said mechanism involving a shifting device; a member connected with the shifting device; and means operative with the weighing mechanisms for alternately engaging said member.

8. The combination of a plurality of weighing mechanisms, each embodying a load-receiver; a conveyer mounted for movement in different directions; mechanism for driving and for reversing the conveyer to supply, first, one load-receiver and then the other, said mechanism involving a lever; and means operative with the weighing mechanisms for actuating said lever.

9. The combination of a plurality of weighing mechanisms each embodying a load-receiver; a conveyer mounted for movement in different directions to supply the respective load-receivers; mechanism for driving and for reversing the conveyer, said mechanism embodying a lever; a bar connected with the lever; and means on the weighing mechanism for alternately operating said bar.

10. The combination of a plurality of weighing mechanisms, each embodying a load-receiver; a conveyer mounted for movement in different directions; mechanism for driving and for reversing the conveyer, said mechanism involving a series of pulleys, a belt shiftable along the same, and a belt-shipper; a bar to which the belt-shipper is pivoted; and means operative with the weighing mechanism for alternately operating said bar.

11. The combination of a plurality of weighing mechanisms, each embodying a load-receiver; a conveyer mounted for movement in different directions; a shaft operative with the conveyer and carrying a series of pulleys, one of which is secured to the shaft; a belt shiftable along said pulleys; a series of gears, one of which is secured to one of the pulleys and another of which is secured to said shaft; and means controlled by the weighing mechanisms for shifting said belt.

12. The combination of a plurality of weighing mechanisms, each embodying a load-receiver; a conveyer mounted for movement in different directions; a shaft coöperative with the conveyer; a series of pulleys on the shaft, one of them being secured thereto; a series of gears, one of which is supported by the framework and another of which is secured to said shaft, and another secured to one of the pulleys; a belt shiftable along said pulleys; and means controlled by the weighing mechanisms for shifting the belt.

13. The combination of a plurality of weighing mechanisms, each embodying a load-receiver; a conveyer mounted for movement in different directions; a shaft coöperative with the conveyer; a series of pulleys supported by said shaft, one of them being fixed thereto; a series of bevel-gears, one of which is secured to the shaft, another of which is mounted on the framework, and the other of which is secured to the shaft; a belt shiftable along said pulleys; a belt-shifter; and means coöperative with the weighing mechanisms for alternately operating said belt-shifter.

14. The combination of a plurality of weighing mechanisms, each embodying a load-receiver; a conveyer mounted for movement in different directions; mechanism for driving the conveyer to supply, first, one load-receiver and then the other, said mechanism involving a shifting device; a bar attached to the shifting device; and actuators affixed to the load-receivers for alternately operating said bar.

15. The combination of a plurality of weighing mechanisms, each embodying a load-receiver; a conveyer mounted for movement in different directions; mechanism for driving the conveyer in one direction to supply one load-receiver, and for driving it in the other direction to supply the other load-receiver; and means coöperative with the conveyer for alternately effecting the discharge of said load-receivers.

16. The combination of a plurality of weighing mechanisms, each embodying a load-receiver; a conveyer mounted for movement in different directions; mechanism for driving the conveyer in one direction to supply one load-receiver, and for driving it in another direction to supply the other load-receiver; means embodying latches for each weighing mechanism, to govern the discharge of the loads; and trippers for the latches, operative with the conveyer and alternately effective.

17. The combination of a plurality of weighing mechanisms, each embodying a load-receiver provided with a closer; closer-holding means embodying a series of latches; a conveyer mounted for movement in different directions; means for driving the conveyer in one direction to supply one load-receiver and for driving it in another direction to supply the other load-receiver; and trippers for said latches, alternately effective and operative with the conveyer.

18. The combination of weighing mechanism embodying a load-receiver; means including a latch for governing the discharge of said load-receiver; a supply-conveyer; mechanism for driving the supply-conveyer in opposite directions; and a tripper for said latch, operative with said conveyer.

19. The combination of weighing mechanism embodying a load-receiver; means including a latch for governing the discharge of the load-receiver; a supply-conveyer mounted for movement in reverse directions; and a tripper on the latch, secured to a shaft of the conveyer.

20. The combination of weighing mechanism embodying a load-receiver; means including a latch for governing the discharge of the load-receiver, the latch having a switch; a conveyer; mechanism for driving the conveyer in different directions; and a tripper in position to engage the switch and operative with the conveyer.

21. The combination of a plurality of weighing mechanisms each including a load-receiver and a scale-beam; a regulator supported independently of and between the weighing mechanisms in position to be shifted alternately by the loads discharged; and a locker for one of the members of the weighing mechanism coöperative with the regulator and serving to lock said member when shifted by the load discharged from the other weighing mechanism.

22. The combination of a plurality of weighing mechanisms each including a load-receiver and a scale-beam; a regulator-blade supported independently of and between the weighing mechanisms and in position to be shifted by the loads alternately discharged therefrom; and a locker for the scale-beams connected with said blade.

23. The combination of a plurality of weighing mechanisms; means for alternately effecting the discharge of the same; a discharge-hopper located below the weighing mechanism and having inclined walls; a regulator alternately shifted by the loads discharged by the weighing mechanisms; and a locker for the weighing mechanisms, connected with the regulator.

24. The combination of a plurality of weighing mechanisms; latches for governing the discharge thereof; a supply-conveyer; mechanism for driving the supply-conveyer in reverse directions to supply the respective load-receivers; and a plurality of trippers coöperative with the conveyer.

25. The combination of a plurality of weighing mechanisms; latches for governing the discharge thereof; a supply-conveyer; mechanism for driving the supply-conveyer in reverse directions to supply the respective load-receivers; and trippers for the latches, each secured to a shaft of the conveyer.

26. The combination of a plurality of weighing mechanisms; latches for governing the discharge thereof; an endless conveyer; mechanism for driving the same in reverse directions; and trippers secured to the shafts of the endless conveyer, and each consisting of an arm provided with a projection at one end.

27. The combination of weighing mechanisms, each embodying a load-receiver; a conveyer; mechanism for driving and for reversing the conveyer; load-discharging mechanism; and reciprocally-effective stops operative, respectively, with the conveyer, driving and reversing, and load-discharging mechanisms.

28. The combination of a plurality of weighing mechanisms; a conveyer; mechanism for driving and for reversing the conveyer, said mechanism involving a lever; a bar connected with the lever and having a stop; and coöperative stops on the weighing mechanism.

FRANCIS H. RICHARDS.

Witnesses:
F. N. CHASE,
HEATH SUTHERLAND.